(12) United States Patent
Ezell

(10) Patent No.: US 10,042,105 B2
(45) Date of Patent: Aug. 7, 2018

(54) LIGHTING ASSEMBLY WITH DEFINED ANGULAR OUTPUT

(71) Applicant: Rambus Delaware LLC, Sunnyvale, CA (US)

(72) Inventor: Robert M. Ezell, Brunswick, OH (US)

(73) Assignee: Rambus Delaware LLC, Brecksville, OH (US)

( * ) Notice: Subject to any disclaimer, the term of this patent is extended or adjusted under 35 U.S.C. 154(b) by 191 days.

(21) Appl. No.: 15/070,430

(22) Filed: Mar. 15, 2016

(65) Prior Publication Data

US 2016/0266300 A1 Sep. 15, 2016

Related U.S. Application Data

(63) Continuation of application No. 14/092,517, filed on Nov. 27, 2013, now Pat. No. 9,316,780.

(60) Provisional application No. 61/869,129, filed on Aug. 23, 2013, provisional application No. 61/732,112, filed on Nov. 30, 2012.

(51) Int. Cl.
*F21V 8/00* (2006.01)

(52) U.S. Cl.
CPC ......... *G02B 6/0036* (2013.01); *G02B 6/0038* (2013.01); *G02B 6/0045* (2013.01); *G02B 6/0058* (2013.01)

(58) Field of Classification Search
CPC .. G02B 6/0036; G02B 6/0038; G02B 6/0045; G02B 6/0058
See application file for complete search history.

(56) References Cited

U.S. PATENT DOCUMENTS

| 5,136,480 | A  | 8/1992 | Pristash et al. |
| 6,528,937 | B1 | 3/2003 | Van Gorkom |
| 6,752,505 | B2 | 6/2004 | Parker et al. |
| 7,161,313 | B2 | 1/2007 | Piepgras et al. |
| 7,223,007 | B1 | 5/2007 | Fredley et al. |
| 7,331,681 | B2 | 2/2008 | Pohlert et al. |

(Continued)

FOREIGN PATENT DOCUMENTS

| DE | 19803987 | 8/1998 |
| EP | 0962693  | 12/1999 |

(Continued)

OTHER PUBLICATIONS

PCT International Search Report and Written Opinion dated Feb. 21, 2014 re Int'l Application No. PCT/US2013/072353. 14 Pages.

(Continued)

*Primary Examiner* — Peggy Neils
(74) *Attorney, Agent, or Firm* — Renner, Otto, Boisselle & Sklar, LLP

(57) ABSTRACT

A lighting assembly includes a light guide and solid-state light emitters to edge-light the light guide, the light emitters arrayed along a transverse direction. The light guide includes two or more sets of optical elements of well-defined shape. Light output from the lighting assembly by the first and second set of optical elements have a first and a second light ray angle distribution, respectively. The optical elements are configured such that when measured in a plane perpendicular to the light guide and the transverse direction: 1) the first and second light ray angle distributions are significantly narrower than an omnidirectional output distribution; and 2) the peak of the second light ray angle distribution is displaced from the peak of the first light ray angle distribution.

20 Claims, 17 Drawing Sheets

(56) References Cited

U.S. PATENT DOCUMENTS

| | | |
|---|---|---|
| 7,651,243 B2 | 1/2010 | McGuire, Jr. et al. |
| 7,663,733 B2 | 2/2010 | Glent-Madsen et al. |
| 7,665,865 B1 | 2/2010 | Hulse et al. |
| 7,806,538 B2 | 10/2010 | Ajiki et al. |
| 8,550,687 B2 | 10/2013 | Gotou et al. |
| 8,840,275 B2 | 9/2014 | Parker et al. |
| 9,010,983 B2 | 4/2015 | Gourlay |
| 9,316,780 B2 | 4/2016 | Ezell |
| 2007/0019408 A1 | 1/2007 | McGuire, Jr. et al. |
| 2007/0211182 A1 | 9/2007 | Erchak et al. |
| 2007/0263388 A1 | 11/2007 | Lai et al. |
| 2009/0091915 A1 | 4/2009 | Eriksson |
| 2009/0103293 A1 | 4/2009 | Harbers et al. |
| 2009/0129119 A1 | 5/2009 | Lee et al. |
| 2010/0033948 A1 | 2/2010 | Harbers et al. |
| 2010/0246158 A1 | 9/2010 | Van Gorkom et al. |
| 2010/0296264 A1 | 11/2010 | Ronda et al. |
| 2010/0315810 A1 | 12/2010 | Tseng |
| 2010/0321931 A1 | 12/2010 | McDermott |
| 2011/0026260 A1 | 2/2011 | Ko |
| 2011/0188228 A1 | 8/2011 | Li |
| 2011/0234076 A1 | 9/2011 | Simon et al. |
| 2013/0286679 A1 | 10/2013 | Chen et al. |
| 2014/0043856 A1 | 2/2014 | Thompson et al. |

FOREIGN PATENT DOCUMENTS

| | | |
|---|---|---|
| EP | 1156268 | 11/2001 |
| EP | 1156268 A1 | 11/2001 |
| JP | 2002237203 | 8/2002 |
| WO | 2009122322 | 10/2009 |
| WO | 2011148171 | 12/2011 |
| WO | WO-2011-148171 A2 | 12/2011 |
| WO | 2012170613 | 12/2012 |
| WO | WO-2012-170613 A2 | 12/2012 |

OTHER PUBLICATIONS

PCT/US2013/072353; PCT International Search Report and Written Opinion of the International Searching Authority dated Feb. 21, 2014. 14 pages.

PCT/US2013/072353; PCT International Preliminary Report on Patentability dated Jun. 2, 2015. 9 pages.

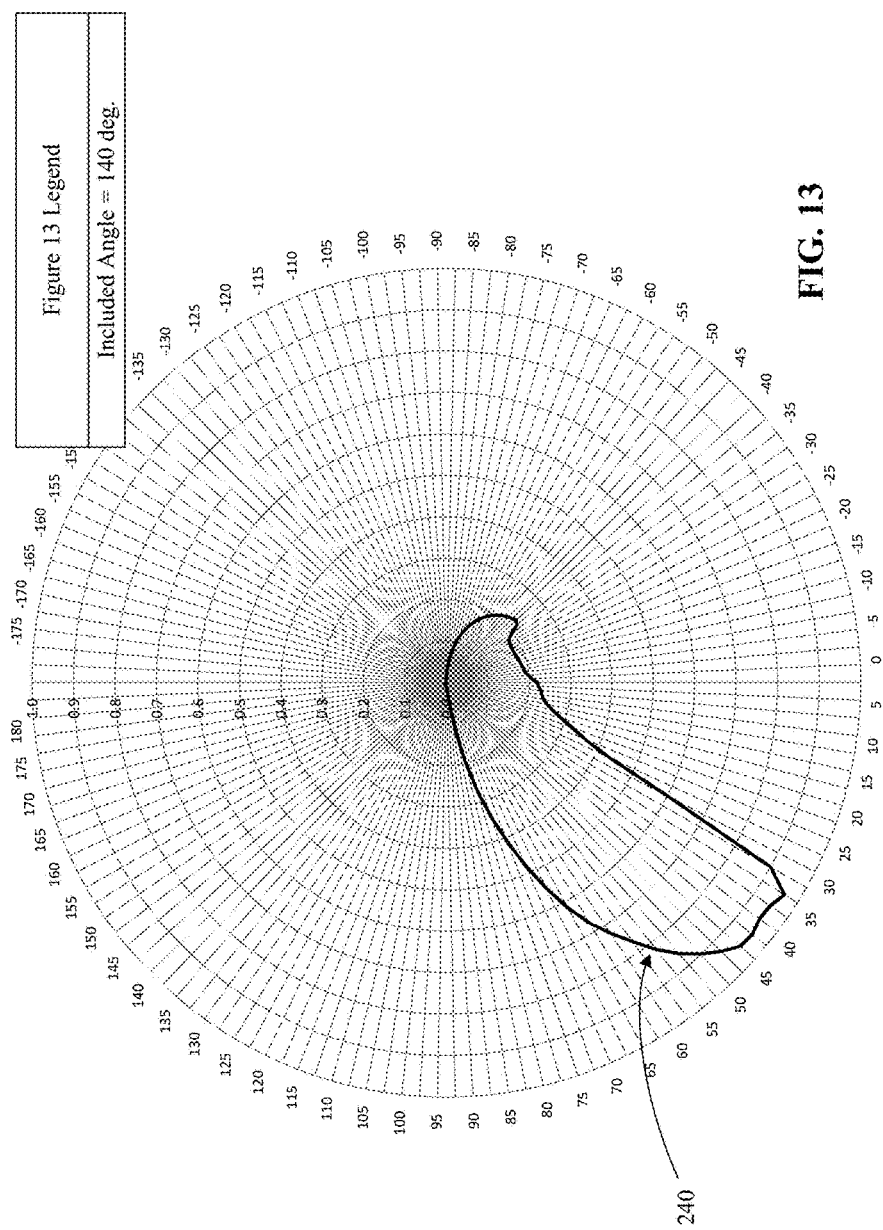

LIGHTING ASSEMBLY WITH DEFINED ANGULAR OUTPUT

RELATED APPLICATION DATA

This application is a continuation of U.S. patent application Ser. No. 14/092,517, filed Nov. 27, 2013, which claims the benefit of U.S. Provisional Patent Application No. 61/732,112, filed Nov. 30, 2012 and U.S. Provisional Patent Application No, 61/869,129, filed Aug. 23, 2013, the disclosures of which are herein incorporated by reference in their entireties.

BACKGROUND

Light emitting diodes (LEDs) show promise as an energy efficient light source for lighting assemblies. For some LED-based lighting assemblies, the light emitted from the light source is input to a light guide and micro-optical elements extract the light from the light guide in defined directions. In particular, efficiency of providing light with a defined angular distribution to illuminate the area of interest is desired for many applications.

BRIEF DESCRIPTION OF THE DRAWINGS

FIGS. 9-13 are polar plots of light ray angle distributions from lighting assemblies using other football-shaped micro-optical elements.

DESCRIPTION

Figure 1:
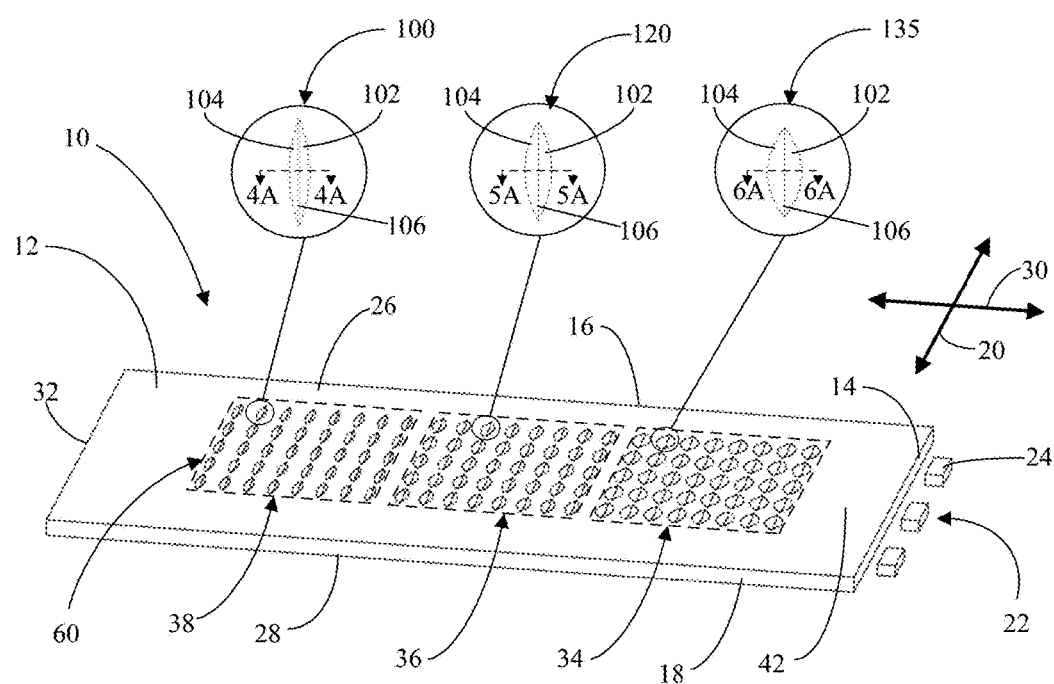
FIG. 1 is a schematic perspective view of a first exemplary lighting assembly.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection, and refraction and output angles are measured relative to the normal to the surface.

Figure 2:
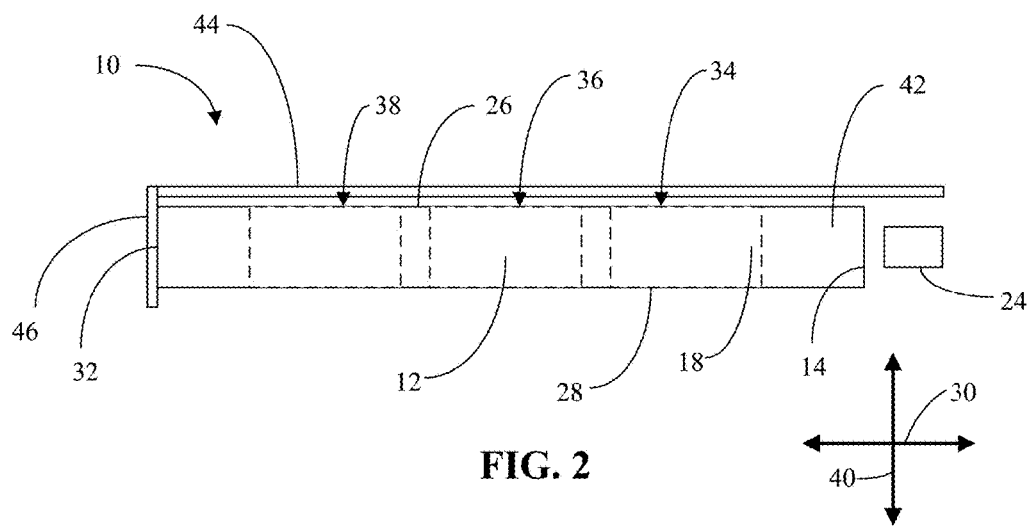
FIG. 2 is a schematic side view of the first exemplary lighting assembly of FIG. 1.

With initial reference to FIGS. 1 and 2, a first exemplary lighting assembly is shown at 10. The lighting assembly 10 includes an optical substrate embodied as a light guide 12. The light guide 12 is a solid article of manufacture made from, for example, polycarbonate, poly(methyl-methacrylate) (PMMA), or other appropriate material. The light guide 12 may also be a multi-layer light guide having two or more layers that may differ in refractive index. The light guide 12 includes a first major surface 26 and a second major surface 28 opposite the first major surface 26. The first major surface 26 is shown as a top major surface and the second major surface is shown as the bottom major surface. The terms top and bottom are relative to an orientation of the lighting assembly 10. Relative nomenclature for aspects of the lighting assembly 10 may change with changes in orientation of the lighting assembly 10. Therefore, terms such as top and bottom are used in this disclosure for descriptive purposes only.

The light guide 12 is configured to propagate light by total internal reflection between the first major surface 26 and the second major surface 28. The length and width dimensions of each of the major surfaces 26, 28 are greater, typically ten or more times greater, than the thickness of the light guide 12. The thickness is the dimension of the light guide 12 in a direction 40 (FIG. 2) perpendicular to the major surfaces 26, 28.

At least one edge surface extends between the major surfaces 26, 28 of the light guide in the thickness direction. The total number of edge surfaces depends on the configuration of the light guide. In the case where the light guide is rectangular, the light guide has four edge surfaces 14, 16, 18, and 32. Other light guide shapes result in a corresponding number of side edges. Depending on the shape of the light guide 12, each edge surface may be straight or curved, and adjacent edge surfaces may meet at a vertex or join in a curve. Moreover, each edge surface may include one or more straight portions connected to one or more curved portions. The edge surface 14 through which light from the light sources 22 is input to the light guide will now be referred to as a light input edge. The light that enters through the light input edge 14 propagates by total internal reflection at the major surfaces 26, 28 towards the edge distal the light input edge 14, referred to as the distal edge 32. In some embodiments, the light guide 12 includes more than one light input edge; for example, the distal edge 32 can be used as a second light input edge. The edges 16 and 18 are referred to as side edges. In the illustrated embodiment, the major surfaces 26, 28 are planar and substantially parallel to each other.

The lighting assembly 10 includes a light source 22 positioned adjacent the light input edge 14. The light source 22 is configured to edge light the light guide 12 such that light from the light source enters the light input edge 14 and propagates along the light guide 12 by total internal reflection at the major surfaces 26, 28. In this example, the light source 22 includes solid-state light emitters 24. The solid-state light emitters 24 constituting the light sources 22 are arranged linearly (linear array) or in another suitable pattern depending on the shape of the light input edge 14 of the light guide 12 to which the light source 22 supplies light. In the example of FIGS. 1 and 2, there are three solid-state light emitters 24 and they are arrayed in a line along the light input edge 14 in a direction 20, which is given by an intersection of the light input edge 14 and one of the major surfaces 26, 28. We also refer to direction 20 as the transverse direction. In this example, the solid-state light emitters are white light emitting LEDs. Direction 30 is perpendicular to direction 20 and extends between the light input edge 14 and distal edge 32. More generally, direction 30 is a direction perpendicular to the transverse direction (direction 20) in which the light guide 12 extends away from the light input edge 14. We also refer to direction 30 as the longitudinal direction. Directions 20 and 30 are parallel to a plane that includes major surface 26 or 28. Furthermore, directions 20 and 30 are perpendicular to direction 40. Generally we refer to the dimension of the light guide along direction 30 (longitudinal direction) as the length of the light guide and to the dimension of the light guide along direction 20 (transverse direction) as the width of the light guide.

The light guide 12 includes micro-features of well-defined shape embodied as micro-optical elements 60 in, on, or beneath at least one of the major surfaces 26, 28. Micro-optical elements that are in, on, or beneath a major surface will be referred to as being "at" the major surface. The micro-optical elements 60 are features of well-defined shape that predictably reflect or refract the light propagating in the light guide 12. In some embodiments, at least one of the micro-optical elements 60 is an indentation in the major surface 26, 28 of well-defined shape. In other embodiments, at least one of the micro-optical elements 60 is a protrusion from the major surface 26, 28 of well-defined shape. In the example of FIGS. 1 and 2, the micro-optical elements 60 are indentations on the first major surface (top major surface) 26.

A micro-optical element of well-defined shape is a three-dimensional feature recessed into a major surface or protruding from a major surface. Micro-optical elements of well-defined shape exclude features of indistinct shape or surface textures, such as printed features of indistinct shape, ink-jet printed features of indistinct shape, selectively-deposited features of indistinct shape, and features of indistinct shape wholly formed by chemical etching or laser etching.

Each micro-optical element 60 functions to disrupt the total internal reflection of the light propagating in the light guide and incident thereon. In one embodiment, the micro-optical elements 60 reflect light toward the opposing major surface so that the light exits the light guide 12 through the opposing major surface. Alternatively, the micro-optical elements 60 transmit light through the micro-optical elements 60 and out of the major surface of the light guide 12 having the micro-optical elements 60. In another embodiment, both types of micro-optical elements 60 are present. In yet another embodiment, the micro-optical elements 60 reflect some of the light and refract the remainder of the light incident thereon. Therefore, the micro-optical elements 60 are configured to extract light from the light guide 12 through one or both of the major surfaces 26, 28. The micro-optical elements 60 are sometimes referred to as light extracting elements.

In the example of FIGS. 1 and 2, the micro-optical elements 60 reflect some of the light and refract some of the light incident thereon. However, as illustrated in FIG. 2, there is a back reflector 44 adjacent to and juxtaposed with the first major surface 26 which reflects most of the light extracted through the first major surface 26 back toward the light guide 12. Therefore, most of the light is output from the lighting assembly 10 through the second major surface 28. This configuration could be used, for example, as a lighting assembly that is suspended from or recessed into a ceiling. The reflector 44 can also be configured to reflect a fraction of the light and transmit the remainder of the light. Additionally, as shown in FIG. 2, there is a distal edge reflector 46 adjacent to and juxtaposed with the distal edge 32, which reflects most of the light passing through the distal edge 32 back into the light guide. Similarly, side edge reflectors (not shown) can be placed adjacent to and juxtaposed with the side edges 16, 18. The back reflector 44 and distal edge reflector 46 are shown omitted in FIG. 1.

The micro-optical elements 60 are configured to extract light with a defined light ray angle distribution from one or both of the major surfaces 26, 28. In this disclosure, the term light ray angle distribution is used to describe the variation of the intensity of light with ray angle (typically a solid angle) over a defined range of light ray angles.

Micro-optical elements 60 are small relative to the linear dimensions of the major surfaces 26, 28. The smaller of the length and width of a micro-optical element 60 is less than one-tenth of the longer of the length and width (or circumference) of the light guide 12 and the larger of the length and width of the micro-optical element 60 is less than one-half of the smaller of the length and width (or circumference) of the light guide 12. The length and width of the micro-optical element 60 is measured in a plane parallel to the major surface 26, 28 of the light guide 12 for planar light guides or along a surface contour for non-planar light guides 12.

Light guides 12 having micro-optical elements 60 are typically formed by a process such as injection molding. Injection molding is known in the art, and typically utilizes a patterning tool for forming the micro-optical elements 60 at the major surface 26, 28 of the light guide 12.

Figure 3:
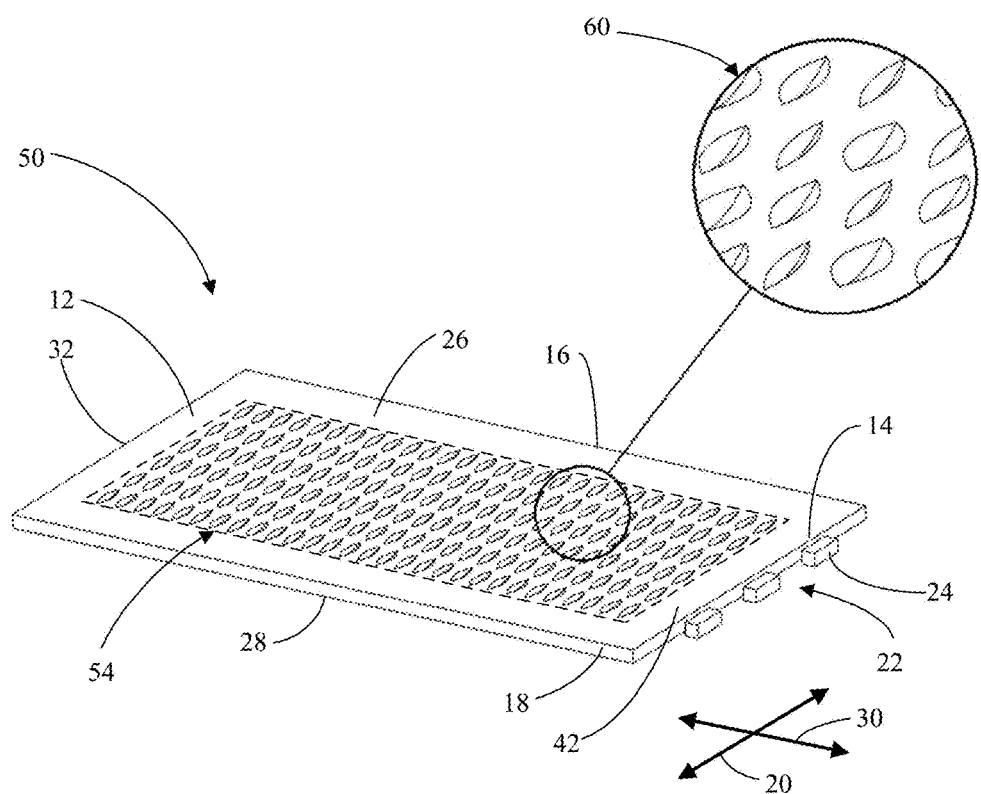
FIG. 3 is a schematic perspective view of a second exemplary lighting assembly.

In the example of FIGS. 1 and 2, the light guide 12 has three light output regions 34, 36, and 38, arrayed along direction 30, which is the longitudinal direction of the light guide 12. The light guide has a transition region 42 where the light from the light sources mixes and spreads after the light enters the light guide through the light input edge 14 and before the light reaches light output regions 34, 36, and 38. Each light output region 34, 36, and 38 has micro-optical elements 100, 120, and 135, respectively. The reference numeral 60 will be generally used to collectively refer to the different embodiments of micro-optical elements. FIG. 1 illustrates an example where the light guide 12 has distinct light output regions where each light output region has micro-optical elements of nominally identical shape. Alternatively, micro-optical elements of different shapes are mixed in a light output region, as shown in FIG. 3. FIG. 3 illustrates a second exemplary lighting assembly 50 in which the light guide 12 has a light output region 54 in which micro-optical elements 60 of different shapes are mixed.

The micro-optical elements 100, 120, and 135 are examples of micro-optical elements 60 configured as V-groove-shaped depressions having an arcuate ridge, hereinafter referred to as "football-shaped," due to similarities in general appearance to part of an American-style football. Such micro-optical elements may alternatively be configured as V-groove-shaped protrusions with an arcuate ridge. Each football-shaped micro-optical element 60 includes a first side surface 102 and a second side surface 104 that come together to form a ridge 106 having ends that intersect the one of the major surfaces 26, 28 at which the micro-optical element 60 is formed. In the example of FIGS. 1 and 2, the ridges 106 generally extend along direction 20, such that the first side surfaces 102 face toward the linear array of solid-state light emitters 24. The reference numeral 102 will be generally used to collectively refer to the different embodiments of the first side surface, and the reference numeral 104 will be generally used to collectively refer to the different embodiments of the second side surface. For each micro-optical element, the first side surface 102 is closer to the light input edge 14 than is the second side surface 104. We also refer to the first side surface as the leading side surface and the second side surface as the trailing side surface.

Figure 4A:
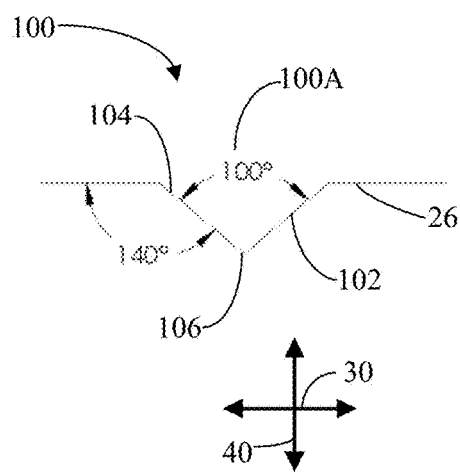
FIGS. 4A, 5A, and 6A are schematic cross-sectional views of exemplary football-shaped micro-optical elements.
Figure 5A:
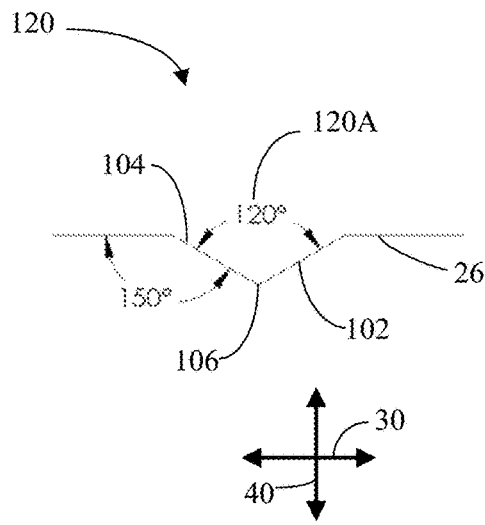
Figure 6A:
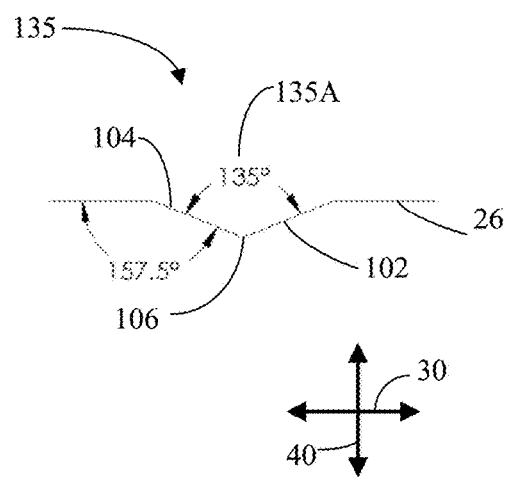

A cross-section of micro-optical element 100, 120, 135, taken along the direction 30 (light guide length direction) at the location of its maximum width and depth, is shown in FIGS. 4A, 5A, 6A. The acute included angle 100 A, 120 A, 135 A formed by the first side surface 102 and second side surface 104 is 100°, 120°, 135°, respectively. We refer to the length of the ridge 106 parallel to the major surface 26 at which the micro-optical element is located (in this case generally along direction 20, the light guide transverse direction) as the length of the micro-optical element 100, 120, 135; the dimension in the direction 40 (light guide thickness direction) as the depth (or height); and the dimension parallel to the major surface 26, 28 at which the micro-optical element is located perpendicular to its length (in this case generally along direction 30, the light guide longitudinal direction) as and the width. Using these conventions, all of the micro-optical elements 100, 120, 135 in the illustrated, exemplary embodiment have a nominal length of approximately 0.290 mm and a nominal depth of approximately 0.022 mm. The micro-optical elements 100, 120, 135 in the illustrated, exemplary embodiment have nominal widths of approximately 0.052 mm, 0.076 mm, and 0.106 mm. These micro-optical elements are elongate and oriented in direction 20 (transverse direction). Note also that in this example, the micro-optical elements 100, 120, 135 are indented symmetrically into the light guide; i.e., the micro-optical elements are not tilted to or away from the light input edge 14 (neither tilted to the right nor to the left relative to the first major surface 26 in FIGS. 4A, 5A, 6A).

Figure 4B:
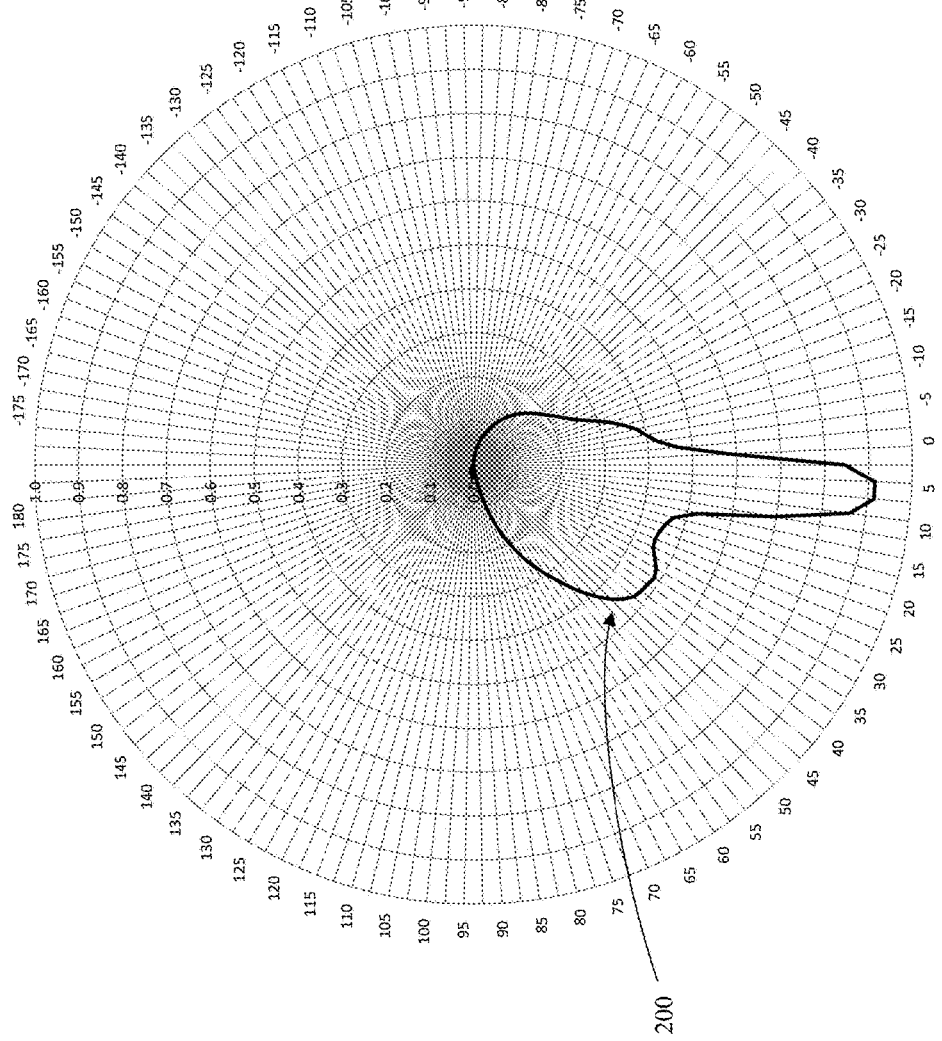
FIGS. 4B, 5B, and 6B are polar plots of light ray angle distributions from lighting assemblies using the football-shaped micro-optical elements of FIGS. 4A, 5A, and 6A, respectively.
Figure 5B:
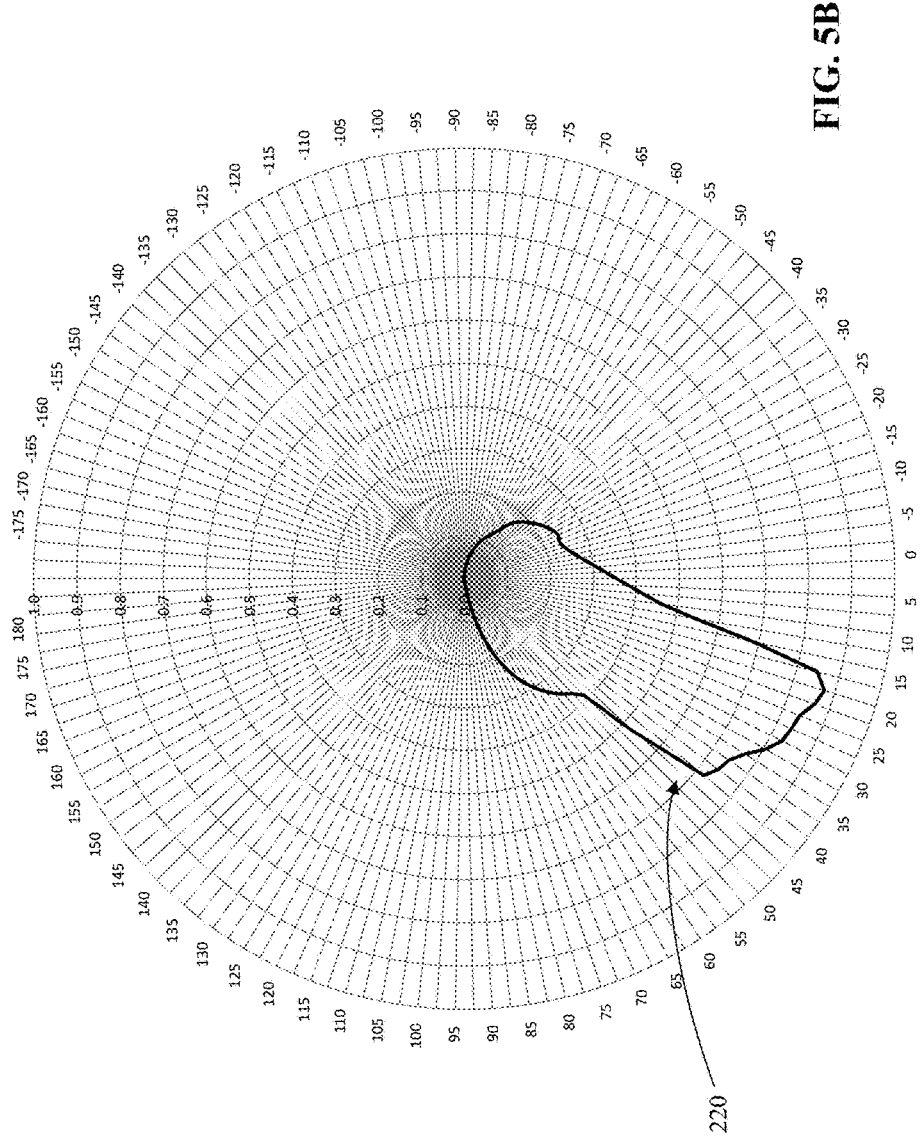
Figure 6B:
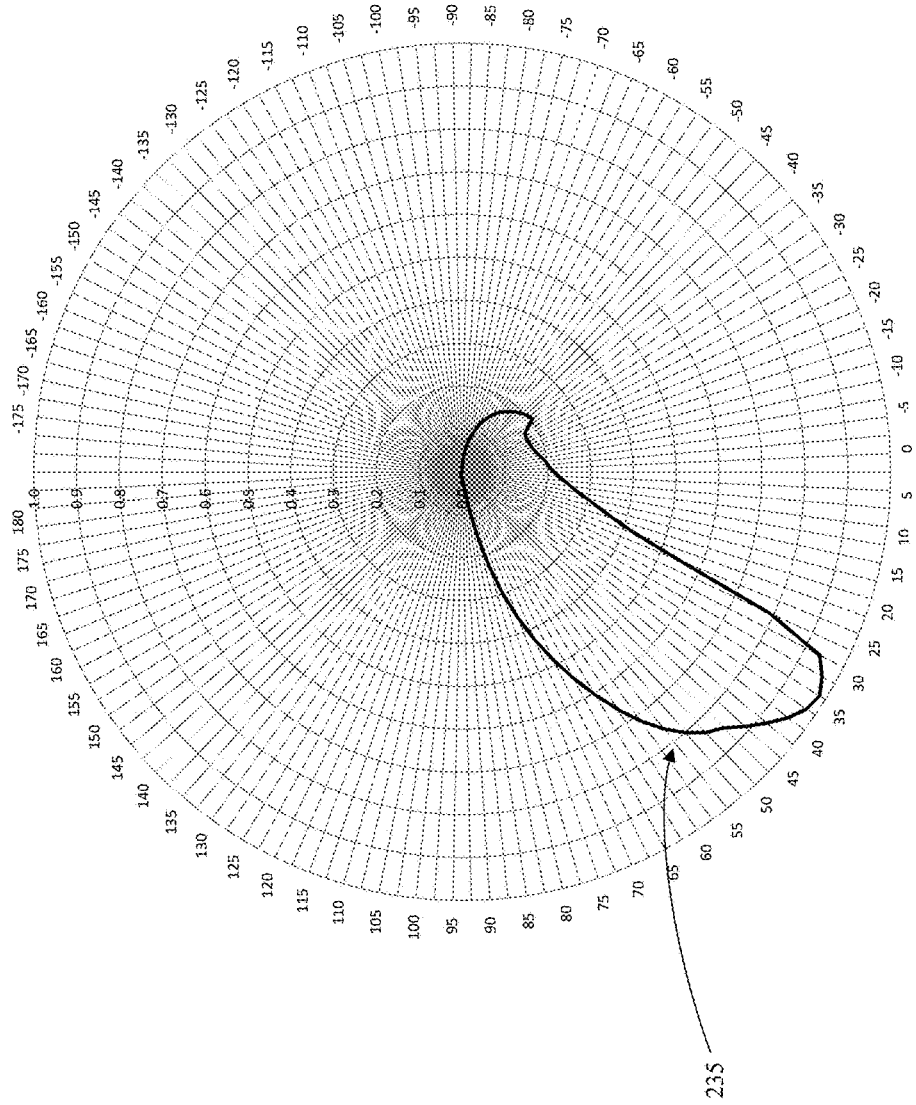

FIG. 4B is a polar plot of the far-field light ray angle distribution 200 of light extracted from a lighting assembly similar to the lighting assembly of FIGS. 1 and 2, except that the light guide 12 only has micro-optical elements 100 (football-shaped elements with included angle of 100°). The light ray angle distribution 200 is measured in a measurement plane perpendicular to the light input edge (transverse direction) and at least one of the major surfaces 26, 28 of the light guide. Since the major surfaces 26, 28 are substantially parallel to each other in many cases, one of the major surfaces 26, 28 can be chosen by convenience. The light source 22 is arranged at −90°, the first major surface 26 (top major surface) is arranged proximate 180°, and the second major surface 28 (bottom major surface) is arranged proximate 0°. The light output is through the second major surface (bottom major surface) because of the back reflector proximate the first major surface 26 (top major surface). The light output is generally away from the light sources, and the peak angle is approximately 6°. A full-width at half maximum (FWHM) is approximately 24°. Polar plots of far-field light ray angle distributions 220, 235 of light extracted from similar lighting assemblies that only have micro-optical elements 120, 135 are shown in FIGS. 5B, 6B, respectively. For micro-optical elements 120 (included angle 120°) and 135 (included angle 135°), the peak angles are 20° and 35°, respectively, and the FWHM values are 38° and 44°, respectively. These light ray angle distributions are significantly narrower than an omnidirectional output distribution. For example, omnidirectional output distributions are obtained from light emitting assemblies having light extracting features of indistinct shape. For an ideal Lambertian omnidirectional output, the FWHM would be 120°.

Figure 7:
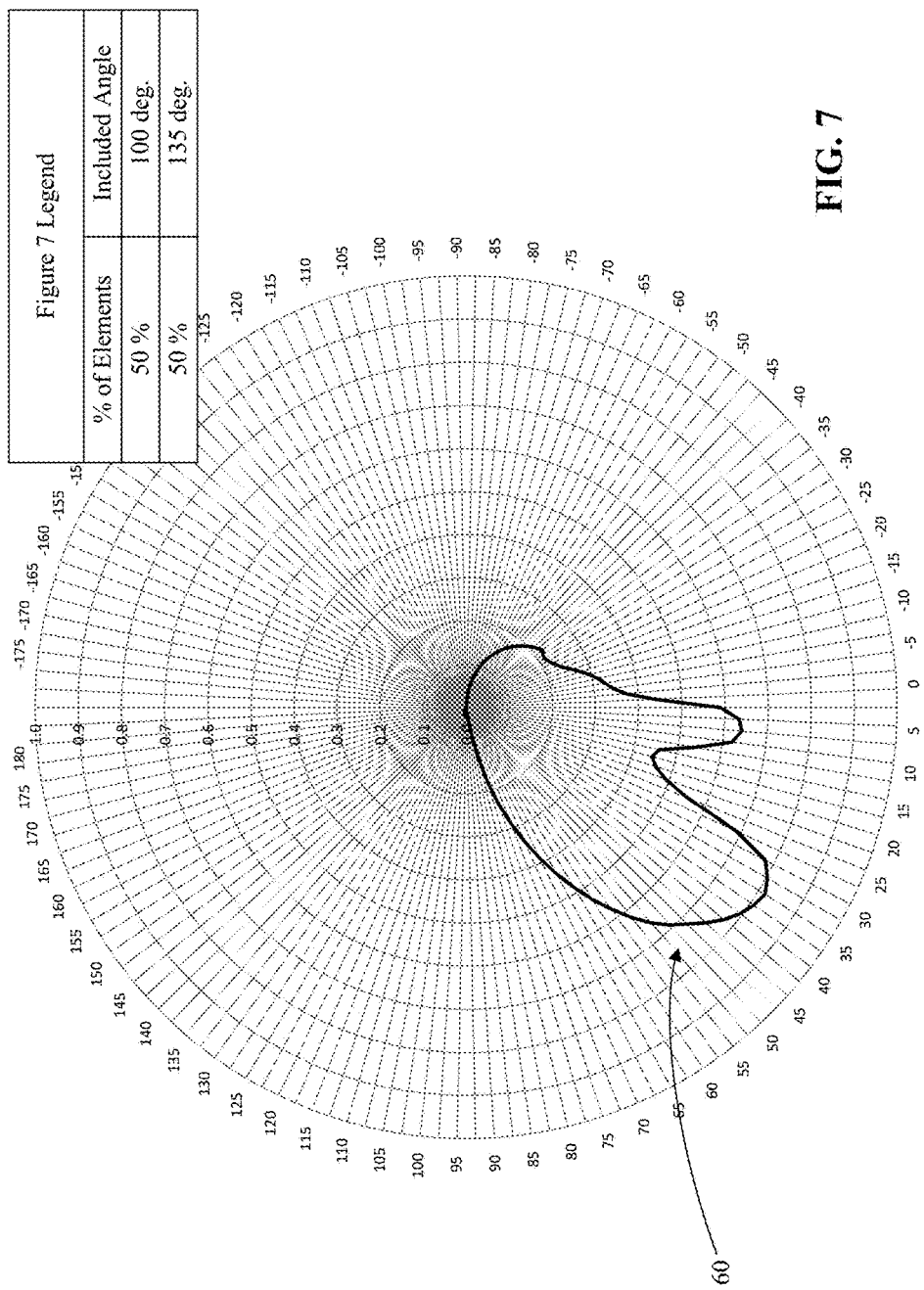
FIG. 7 is a polar plot of a light ray angle distribution from a lighting assembly using the football-shaped micro-optical elements of FIGS. 4A and 6A.

FIG. 7 is a polar plot of a far-field light ray angle distribution 60 of light extracted from a lighting assembly in which 50% of the micro-optical elements are micro-optical elements 100 (football-shaped elements with included angle 100°) and 50% of the micro-optical elements are micro-optical elements 135 (football-shaped elements with included angle 135°). There are two peaks in the light ray angle distribution 60 attributable to each of the micro-optical elements 100, 135 with a "gap" between them where the intensity is relatively low. In some applications, light ray angle distributions that do not have such "gaps" are preferred.

Figure 8:
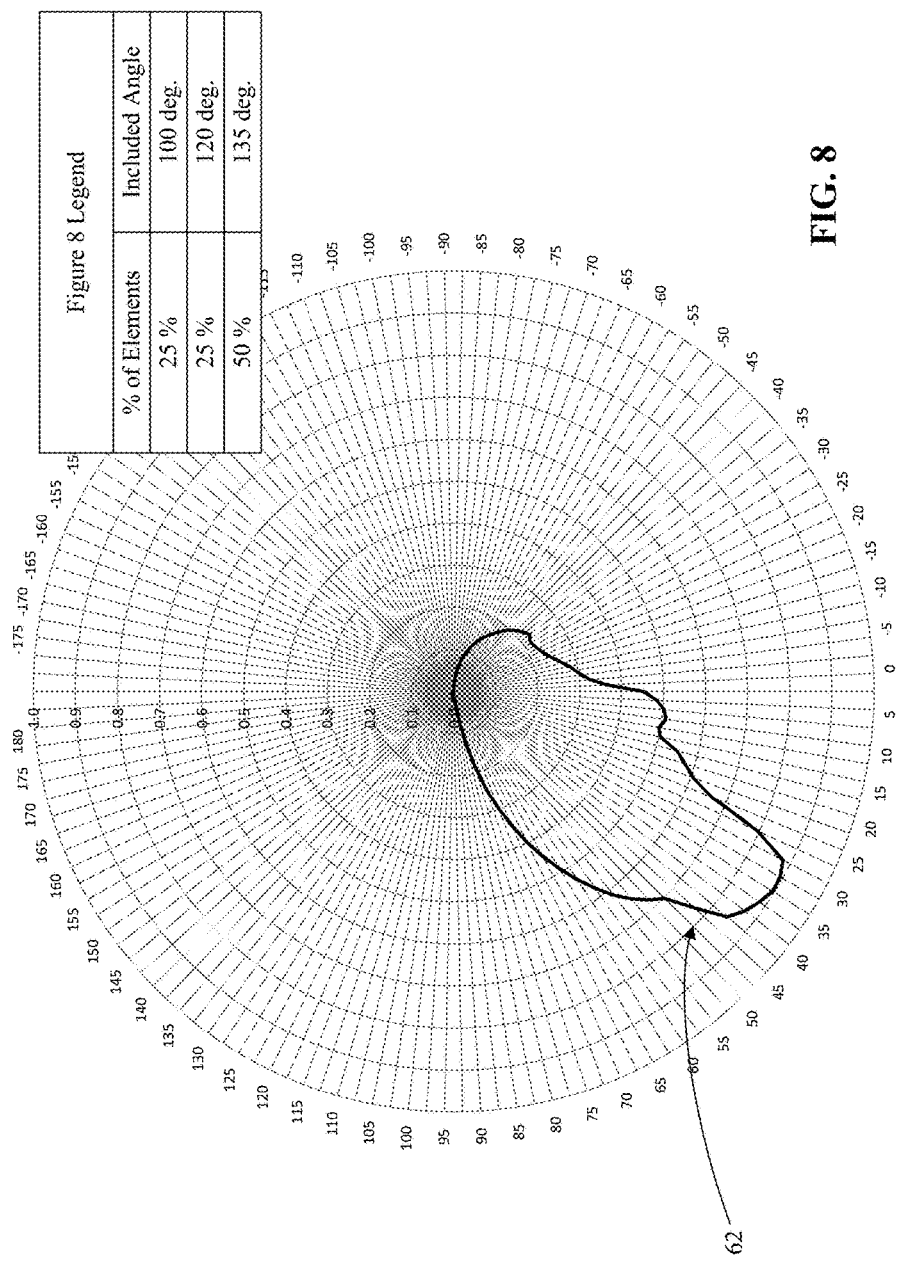
FIG. 8 is a polar plot of a light ray angle distribution from a lighting assembly using the football-shaped micro-optical elements of FIGS. 4A, 5A, and 6A.
Figure 9:
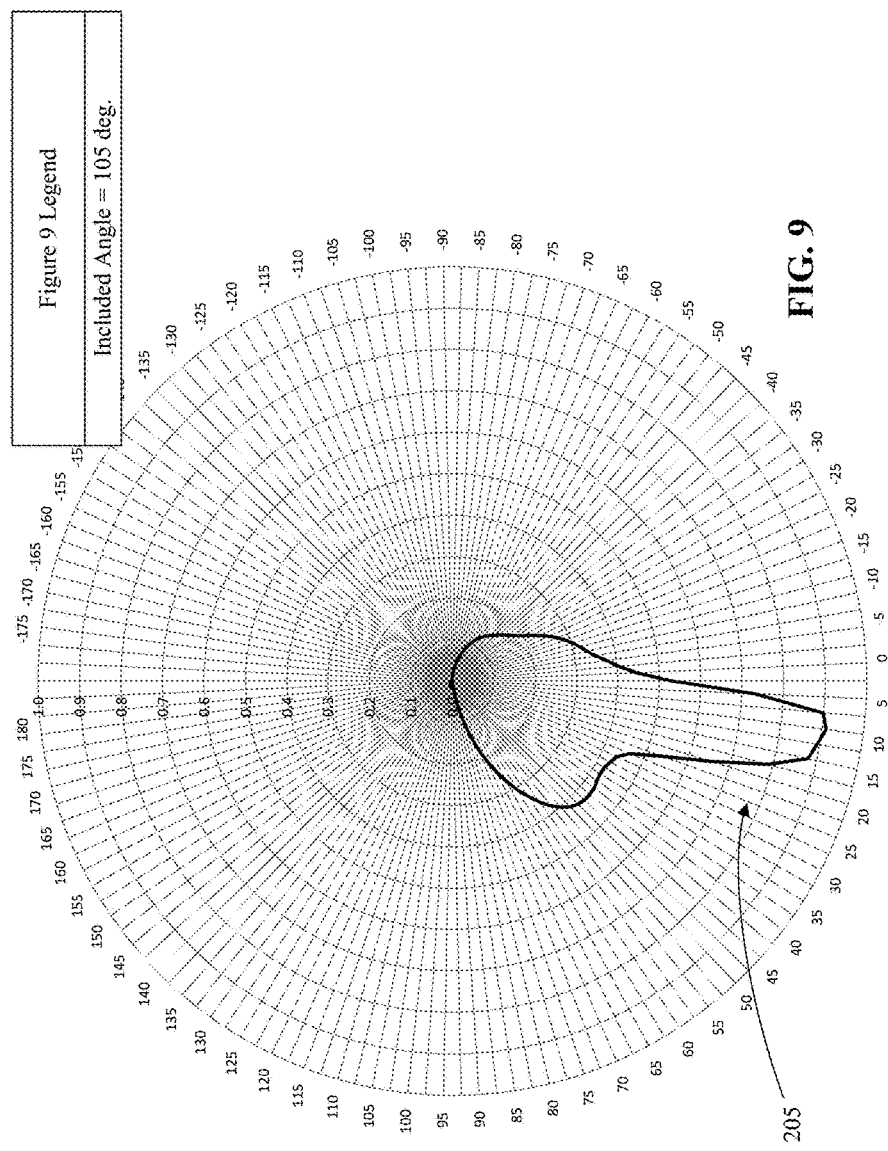
Figure 10:
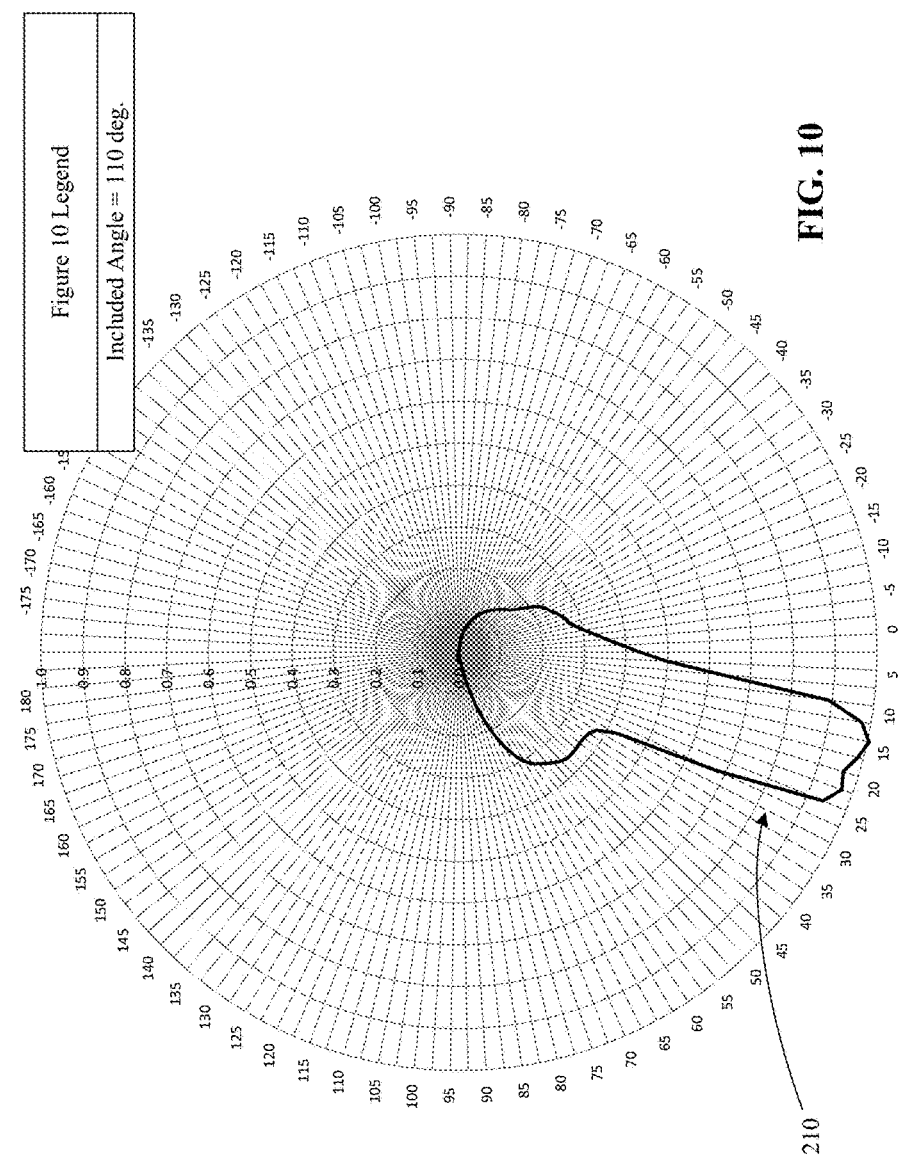
Figure 11:
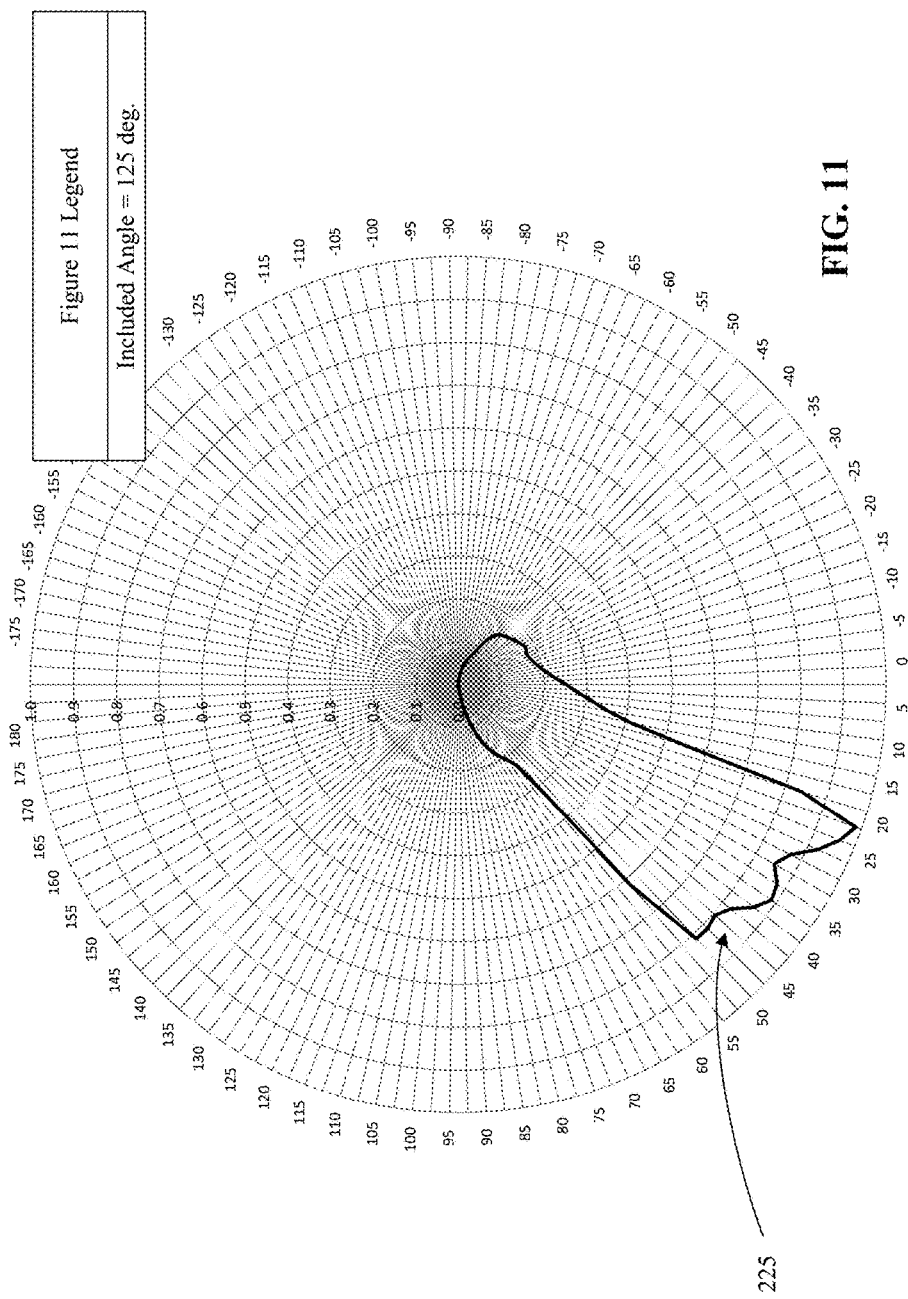
Figure 12:
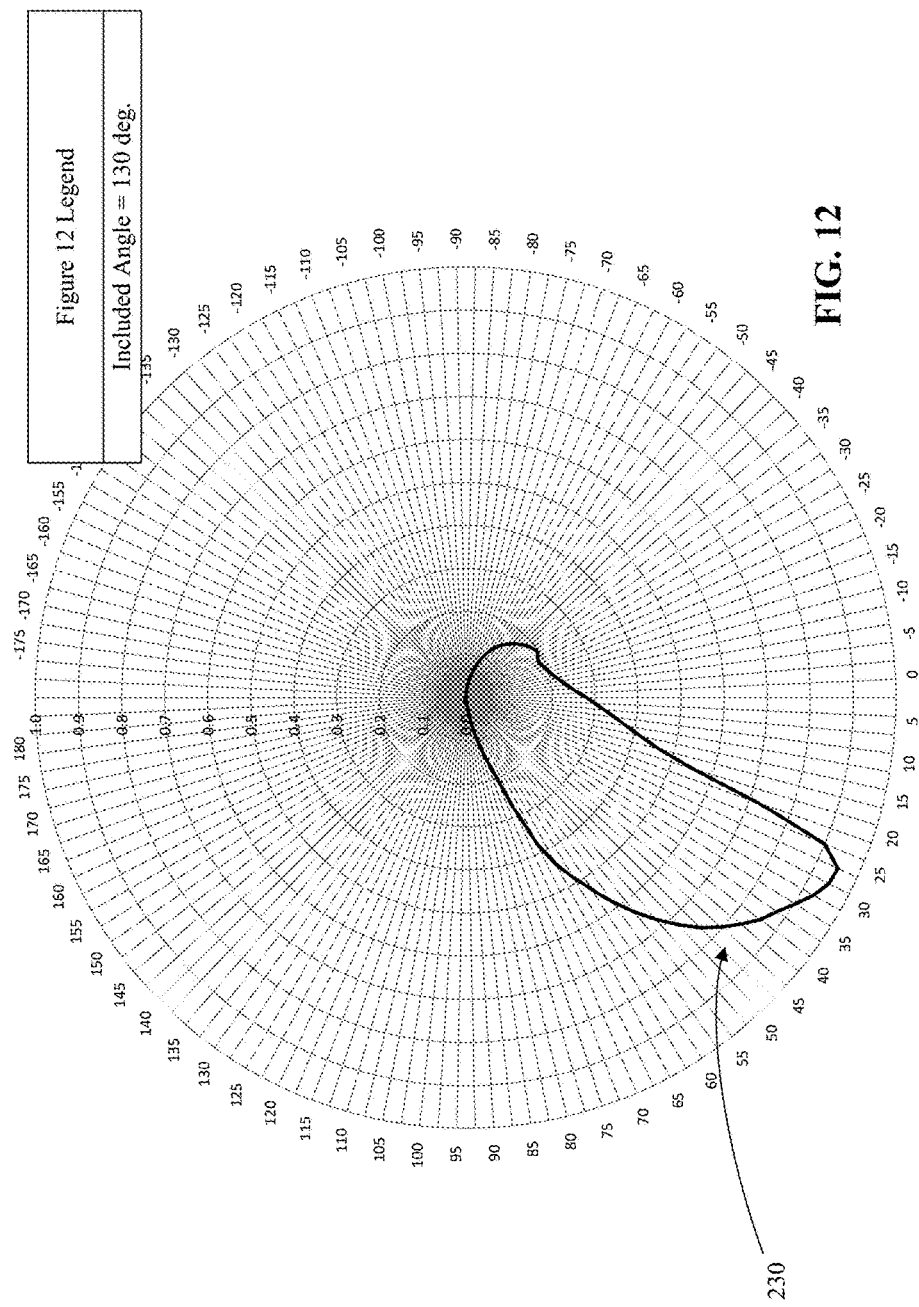

FIG. 8 is an example of a light ray angle distribution arising from three micro-optical element shapes (100, 120, 135) instead of two micro-optical element shapes (100, 135) as in FIG. 7. FIG. 8 is a polar plot of a far-field light ray angle distribution 62 of light extracted from a lighting assembly in which 25% of the micro-optical elements are micro-optical elements 100 (football-shaped elements with included angle 100°), 25% of the micro-optical elements are micro-optical elements 120 (football-shaped elements with included angle 120°), and 50% of the micro-optical elements are micro-optical elements 135 (football-shaped elements with included angle 135°). By adjusting the selection and proportion of micro-optical elements, the light ray angle distribution can be adjusted. In particular, FIG. 8 illustrates an example of filling in a "gap" in the light ray angle distribution by including an additional micro-optical element shape.

The light ray angle distributions of lighting assemblies having football-shaped elements with other included angles have also been measured. FIGS. 9, 10, 11, 12, 13 are polar plots of the far-field light ray angle distributions (205, 210, 225, 230, 240) from 105°, 110°, 125°, 130°, and 140° included angle football-shaped micro-optical elements, respectively. All of these football-shaped micro-optical elements have a nominal length of approximately 0.290 mm and a nominal depth of approximately 0.022 mm. In all cases, they are oriented with the ridges 106 in the transverse direction 20. The widths of these football-shaped micro-optical elements vary according to the included angles. The peak angle and FWHM values for these football-shaped micro-optical elements are summarized in Table 1 below. For each micro-optical element shape listed in Table 1, the peak angle is displaced from those of other micro-optical element shapes. For all football-shaped micro-optical element shapes listed in Table 1, the FWHM is significantly narrower than an omnidirectional light ray angle distribution.

TABLE 1

| Optical element | Peak angle (degrees) | FWHM (degrees) |
| --- | --- | --- |
| Football shaped, included angle = 100° | 6 | 24 |
| Football shaped, included angle = 105° | 10 | 26 |
| Football shaped, included angle = 110° | 15 | 24 |
| Football shaped, included angle = 120° | 20 | 38 |
| Football shaped, included angle = 125° | 23 | 37 |
| Football shaped, included angle = 130° | 28 | 45 |
| Football shaped, included angle = 135° | 35 | 44 |

TABLE 1-continued

| Optical element | Peak angle (degrees) | FWHM (degrees) |
| --- | --- | --- |
| Football shaped, included angle = 140° | 40 | 42 |
| Shape shown at 100R | 11 | 82 |
| Omnidirectional | NA | 120 |

Figure 14A:
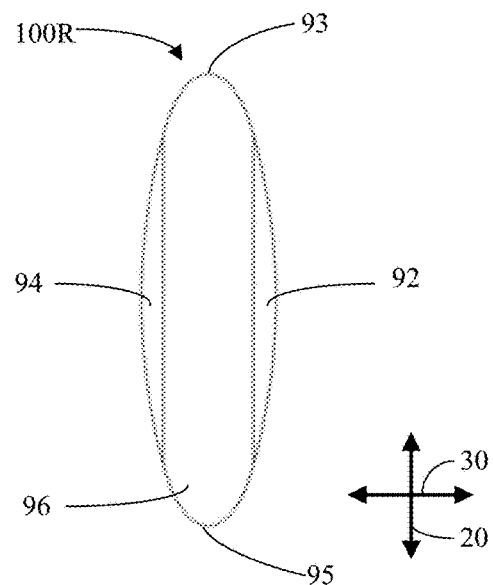
FIGS. 14A and 14B are schematic plan and side views of another micro-optical element.
Figure 14B:
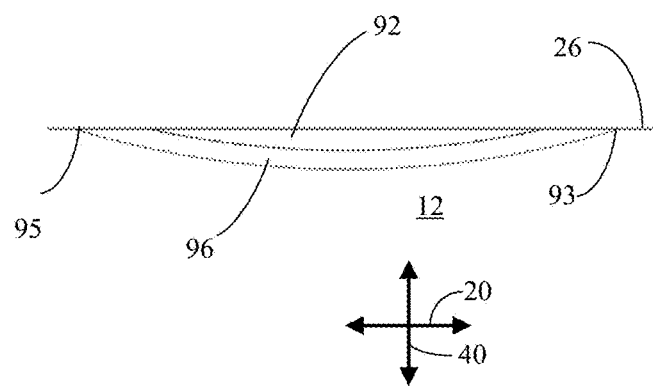

FIGS. 14A and 14B illustrate a micro-optical element that produces a light ray angle distribution that is wider than the football-shaped micro-optical elements described above and still significantly narrower than an omnidirectional light ray angle distribution. Micro-optical element 100R is shown in plan view in FIG. 14A and in side view from the light input edge 14 in FIG. 14B. Micro-optical element 100R is elongate along direction 20 (transverse direction), and has a first side surface 92 (leading surface) and a second side surface 94 (trailing surface), in which the leading surface faces toward the linear array of light sources 22. These micro-optical elements are elongate in direction 20 (transverse direction). Instead of coming together to form a ridge, there is a rounded surface 96 connecting the first side surface 92 and the second side surface 94. The rounded surface 96 is configured to be tangential to the first side surface 92 and the second side surface 94. In other words, the rounded surface 96 is rounded in a plane that includes the longitudinal direction 30 and thickness direction 40. We refer to the length of the rounded surface 96 parallel to the major surface 26 at which the micro-optical element is located (in this case generally along transverse direction 20) as the length of the micro-optical element 100R; the dimension in the thickness direction 40 as the depth (or height); and the dimension parallel to the major surface 26, 28 at which the micro-optical element is located perpendicular to its length (in this case generally along longitudinal direction 30) as and the width. Using these conventions, micro-optical element 100R has a nominal length of approximately 0.290 mm, a nominal depth of approximately 0.022 mm, and a nominal width of approximately 0.085 mm. For each micro-optical element 100R, the first side surface 92 is closer to the light input edge 14 than is the second side surface 94. The rounded surface 96 is rounded with a radius of curvature of 0.045 mm in a plane that includes longitudinal direction 30 and thickness direction 40. The rounded surface 96 is arcuate such that its ends 93 and 95 intersect the one of the major surfaces 26, 28 at which the micro-optical element 100R is formed. The length of the micro-optical element 100R is the distance between the rounded surface ends 93, 95. Even though the first side surface 92 and the second side surface 94 do not intersect, the included angle between them can be found by extending the first and second side surfaces toward each other. In this case, the included angle is 100°. These micro-optical elements are elongate and oriented in transverse direction 20. In comparison to the football-shaped micro-optical element 100 with included angle of 100°, the light ray angle distribution is broader because of the rounded surface 96.

Figure 14C:
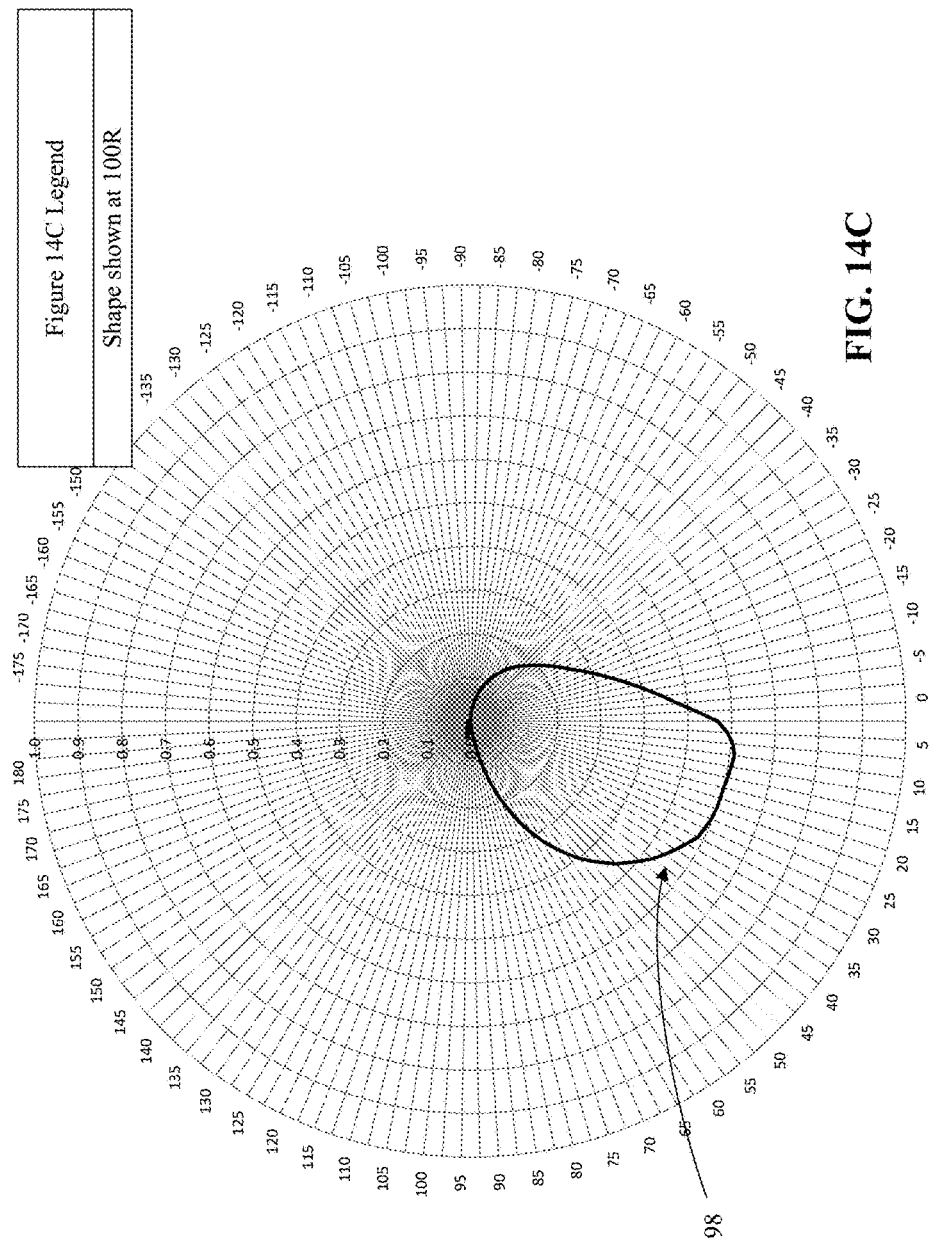
FIG. 14C is a polar plot of a light ray angle distribution from a lighting assembly using the micro-optical element of FIG. 14A.

FIG. 14C is a polar plot of the far-field light ray angle distribution 98 from micro-optical elements 100R. The peak angle and FWHM are included in Table 1. Compared to the 100° included angle football-shaped micro-optical element, the FWHM has broadened from approximately 24° to approximately 82°.

Figure 15:
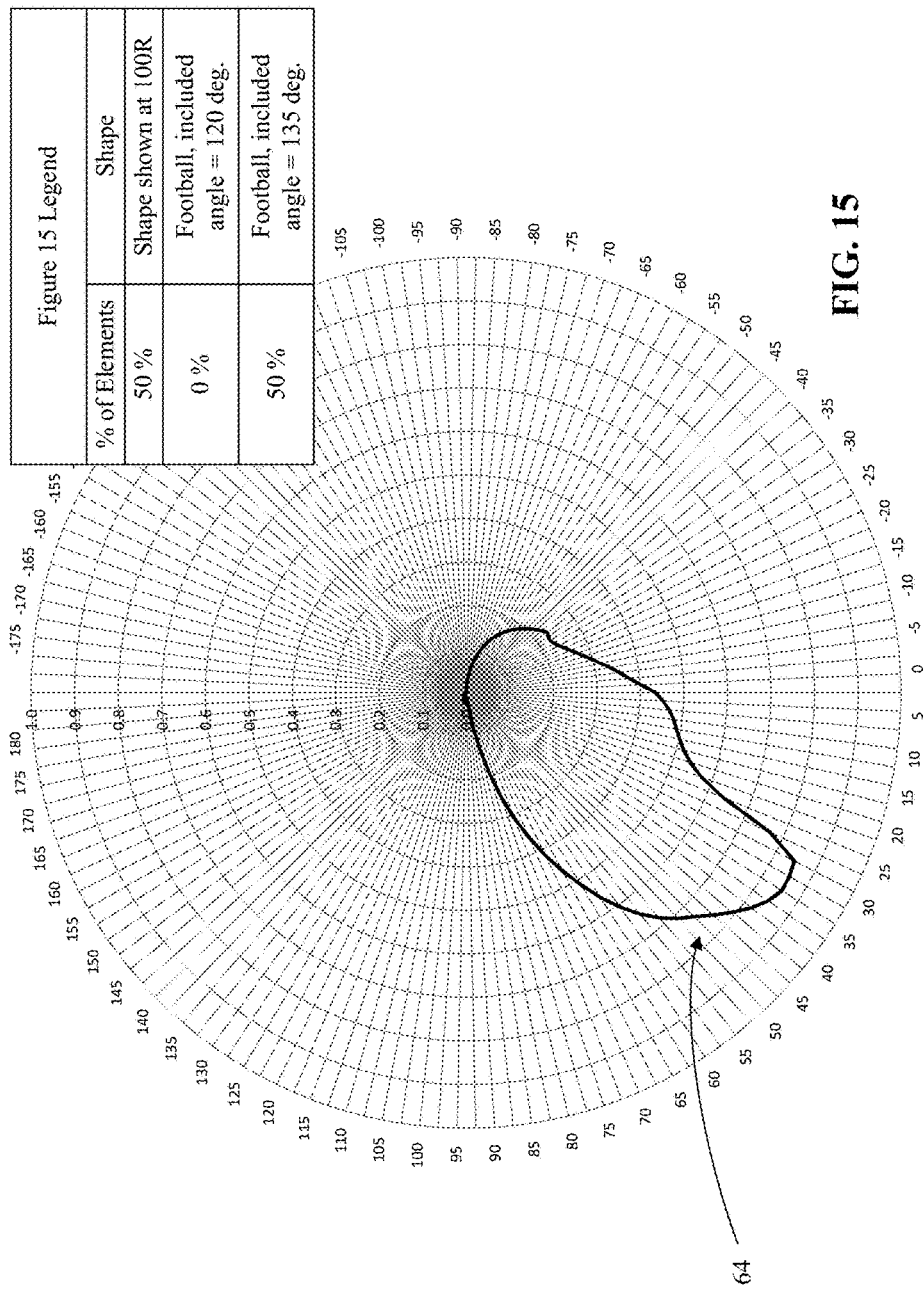
FIG. 15 is a polar plot of a light ray angle distribution from a lighting assembly using the micro-optical elements of FIGS. 14A and 6A.

FIG. 15 illustrates a light ray angle distribution output from a third exemplary lighting assembly incorporating the rounded elongate micro-optical element 100R. Specifically, FIG. 15 is a polar plot of a far-field light ray angle distribution 64 of light extracted from a lighting assembly in which 50% of the micro-optical elements are rounded elongate micro-optical elements 100R and 50% of the micro-optical elements are micro-optical elements 135 (football-shaped elements with included angle 135°). In comparison to the light ray angle distribution 60 (FIG. 7), there is no observable gap in the light ray angle distribution because of the broader output of rounded micro-optical element 100R relative to the football-shaped micro-optical element 100.

As used herein, the term "shape" refers to the overall structure of the micro-optical element 60. Therefore, the micro-optical element 100 and the micro-optical element 120 have different shapes. But, these two elements are both of the same shape type in that they are both "football-shaped." A "shape-type" refers to a combination of geometric features (e.g., surfaces, included angles, ridge features, etc.) that combine to form the micro-optical element 60. If two micro-optical elements 60 have the same combination of geometric features, but different sizes for any those geometric features, then they are considered to have different shapes, but are of the same shape type. Other exemplary embodiments of the light guide 12 may include micro-optical elements 60 having other suitable shapes and/or shape types. Exemplary micro-optical elements 60 are described in U.S. Pat. No. 6,752,505, the entire content of which is incorporated by reference, and, for the sake of brevity, are not described in detail in this disclosure. Exemplary other possible shape types include, but are not limited to, V-grooves (e.g., two planar surfaces that intersect at a straight ridge), truncated cones, wedges, the element of FIGS. 14A and 14B discussed above, etc. The micro-optical elements 60 for the light guide 12 may be all of the same shape type (e.g., football-shaped or another shape type). Alternatively, a mix of shapes types may be employed (e.g., truncated cones and V-grooves). Typically, each light output region (e.g., regions 34, 36, and 38) will respectively include micro-optical elements 60 with the same shape. In other embodiments, one or more of the light output regions (e.g., regions 34, 36, and 38) include micro-optical elements 60 with a mix of shapes that are all of the same shape type. In still other embodiments, one or more of the light output regions (e.g., regions 34, 36, and 38) include micro-optical elements 60 with a mix of shapes types.

Figure 16:
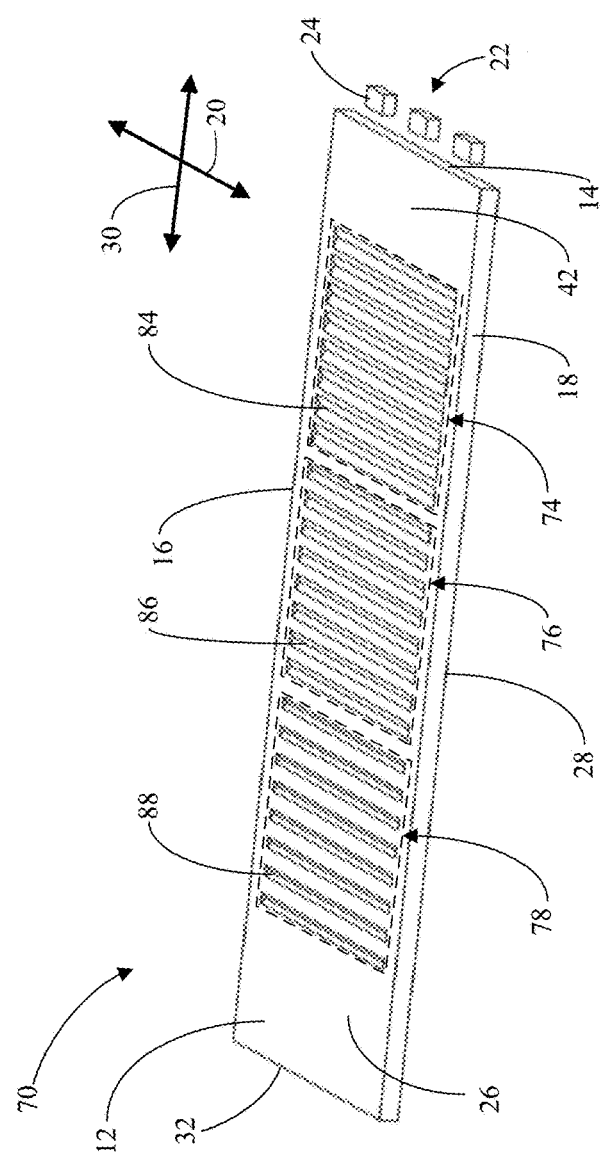
FIG. 16 is a schematic perspective view of a third exemplary lighting assembly.

Additionally, well-defined optical elements that are larger than micro-optical elements can be used, an example of which is shown in FIG. 16. FIG. 16 is a schematic perspective view of a third lighting assembly 70, which is similar to the first lighting assembly 10 (FIG. 1). The light guide 12 has three light output regions 74, 76, and 78, arrayed along the light guide longitudinal direction 30. The light guide has a transition region 42 where the light from the light sources 22 mixes and spreads after the light enters the light guide through the light input edge 14 and before the light reaches light output regions 74, 76, and 78. Each light output region 74, 76, and 78 has elongate optical elements 84, 86, 88, respectively, configured as V-groove-shaped depressions having a ridge. Such optical elements may alternatively be configured as V-groove-shaped protrusions with a ridge. As shown, each optical element extends across most of the transverse dimension (direction 20) of the light guide 12. The optical elements can extend across ninety percent (90%) or more of the transverse dimension of the light guide 12. Although not illustrated in detail, optical elements 84, 86, and 88 include a first side surface (leading side surface) and a second side surface (trailing side surface) that come together to form a ridge. In the example of FIG. 16, the ridges generally extend along transverse direction 20, such that the first side surfaces face toward the linear array of light sources 22. The optical elements 84, 86, and 88 differ in that the included angles formed by the first and second side surfaces differ. For example, the included angles in optical elements 84 can be 135°, the included angles in optical elements 86 can be 120°, and the included angles in optical elements 88 can be 100°. In such case, a cross section taken across the light guide in the light guide length direction (direction 30) would appear similar to FIGS. 4A, 5A, and 6A. The optical elements 84, 86, and 88 are sometimes referred to as light extracting elements.

Lighting assemblies in accordance with the present disclosure are configurable for use in various applications and may include additional components. For example, although not specifically shown in detail, in some embodiments of the lighting assembly, the light source 22 includes structural components to retain the solid-state light emitters 24 and the solid-state light emitters 24 can be mounted to a printed circuit board (PCB). The light source 22 may additionally include circuitry, power supply, electronics for controlling and driving the solid-state light emitters 24, and/or any other appropriate components.

Exemplary solid-state light emitters 24 include such devices as LEDs, laser diodes, and organic LEDs (OLEDs). In an embodiment where the solid-state light emitters 24 are LEDs, the LEDs may be top-fire LEDs or side-fire LEDs, and may be broad spectrum LEDs (e.g., white light emitting LEDs) or LEDs that emit light of a desired color or spectrum (e.g., red light, green light, blue light, or ultraviolet light), or a mixture of broad-spectrum LEDs and LEDs that emit narrow-band light of a desired color. In one embodiment, the solid-state light emitters 24 emit light with no operably-effective intensity at wavelengths greater than 500 nanometers (nm) (i.e., the solid-state light emitters 24 emit light at wavelengths that are predominantly less than 500 nm). In some embodiments, the solid-state light emitters 24 constituting light source 22 all generate light having the same nominal spectrum. In other embodiments, at least some of the solid-state light emitters 24 constituting light source 22 generate light that differs in spectrum from the light generated by the remaining solid-state light emitters 24. For example, two different types of solid-state light emitters 24 are alternately located along the light source 22.

In some embodiments, the lighting assembly 10 is a part of a lighting fixture, a sign, a light bulb (e.g., A-series LED lamp or PAR-type LED lamp), or an under-cabinet lighting fixture (e.g., lighting fixture for use under kitchen cabinets).

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A lighting assembly, comprising:
   a plurality of solid-state light emitters;
   a light guide comprising a light input edge adjacent the light emitters, a first major surface and a second major surface opposite the first major surface, the first major surface and the second major surface each extending in a longitudinal direction and in a transverse direction perpendicular to the longitudinal direction, the first major surface and the second major surface spaced apart from one another in a thickness direction, a first set of optical elements of well-defined shape positioned at a first light output region at one of the major surfaces, and a second set of optical elements of well-defined shape positioned at a second light output region at one of the major surfaces, the first light output region and the second light output region being non-overlapping regions in the thickness direction, optical elements of the first set of optical elements at the first light output region arranged in the transverse direction relative to one another and optical elements of the first set of optical elements at the first light output region arranged in the longitudinal direction relative to one another, optical elements of the second set of optical elements at the second light output region arranged in the transverse direction relative to one another and optical elements of the second set of optical elements at the second light output region arranged in the longitudinal direction relative to one another, wherein light from the light emitters propagates in the light guide by total internal reflection at the major surfaces, light output from the lighting assembly by the first set of optical elements has a first light ray angle distribution and light output from the lighting assembly by the second set of optical elements has a second light ray angle distribution, the light emitters being arrayed along the light input edge in the transverse direction, and a measurement plane being defined to be perpendicular to the transverse direction and to the first major surface or the second major surface of the light guide, wherein:
   the first light ray angle distribution in the measurement plane is narrower than an omnidirectional output distribution and the second light ray angle distribution in the measurement plane is narrower than an omnidirectional output distribution; and
   a peak of the second light ray angle distribution in the measurement plane is displaced from a peak of the first light ray angle distribution in the measurement plane.

2. The lighting assembly of claim 1, wherein the first set of optical elements and the second set of optical elements are both positioned at the same one of the first major surface or the second major surface.

3. The lighting assembly of claim 1, additionally comprising a third set of optical elements of well-defined shape positioned at a third light output region different than the first and second light output regions at one of the major surfaces, optical elements of the third set of optical elements at the third light output region arranged in the transverse direction relative to one another and optical elements of the third set of optical elements at the third light output region arranged in the longitudinal direction relative to one another, light output from the lighting assembly by the third set of optical elements has a third light ray angle distribution, wherein:
   the third light ray angle distribution in the measurement plane is narrower than an omnidirectional output distribution;
   a peak of the third light ray angle distribution in the measurement plane is displaced from a peak of the first light ray angle distribution in the measurement plane; and
   a peak of the third light ray angle distribution in the measurement plane is displaced from a peak of the second light ray angle distribution in the measurement plane.

4. The lighting assembly of claim 1, wherein at least one of the first light ray angle distribution or the second light ray angle distribution in the measurement plane has a full width at half maximum of less than 90°.

5. The lighting assembly of claim 1, wherein at least one of the first light ray angle distribution or the second light ray angle distribution in the measurement plane has a full width at half maximum of less than 45°.

6. The lighting assembly of claim 1, wherein a peak of the second light ray angle distribution in the measurement plane is displaced from a peak of the first light ray angle distribution in the measurement plane by 10° or more.

7. The lighting assembly of claim 1, wherein the optical elements of at least one of the first set or the second set are elongate in the transverse direction.

8. The lighting assembly of claim 7, wherein the optical elements of the first set comprise a first leading surface and a first trailing surface, the first leading surface being closer to the light input edge than is the first trailing surface for each of the optical elements.

9. The lighting assembly of claim 8, wherein the first leading surface and the first trailing surface intersect to form a ridge, wherein the ridge is arcuate and intersects the first major surface or the second major surface at which the optical element is positioned at its ends.

10. The lighting assembly of claim 8, wherein the first leading surface and the first trailing surface are connected by a first rounded surface that is tangential to the first leading surface and to the first trailing surface.

11. The lighting assembly of claim 10, wherein the rounded surface is arcuate and intersects the first major surface or the second major surface at which the optical element is positioned at its ends.

12. The lighting assembly of claim 1, wherein:
the optical elements of the first set are nominally identical to one another in shape, the optical elements of the second set are nominally identical to one another in shape, and the optical elements of the first set are different from the optical elements of the second set.

13. The lighting assembly of claim 1, wherein:
the optical elements of the first set are nominally identical to one another in shape.

14. The lighting assembly of claim 1, wherein:
at least one of the first set of optical elements and the second set of optical elements comprises optical elements having a mix of shapes that are all of the same shape type.

15. The lighting assembly of claim 1, wherein:
at least one of the first set of optical elements and the second set of optical elements comprises optical elements having a mix of shape types.

16. The lighting assembly of claim 1, wherein the optical elements of the first set are micro-optical elements.

17. The lighting assembly of claim 1, wherein the second light output region is farther from the light input edge in the longitudinal direction than the first light output region.

18. The lighting assembly of claim 1, wherein:
the optical elements of the first set of optical elements and the optical elements of the second set of optical elements have the same shape type;
the optical elements of the first set of optical elements are nominally identical to one another in shape;
the optical elements of the second set of optical elements are nominally identical to one another in shape; and
the optical elements of the first set of optical elements are different in shape from the optical elements of the second set of optical elements.

19. A lighting assembly, comprising:
a plurality of solid-state light emitters;
a light guide comprising a light input edge adjacent the light emitters, a first major surface and a second major surface opposite the first major surface, the first major surface and the second major surface each extending in a longitudinal direction and in a transverse direction perpendicular to the longitudinal direction, a first set of optical elements of well-defined shape positioned at a first light output region at the first major surface, and a second set of optical elements of well-defined shape positioned at a second light output region adjacent to the first light output region at the first major surface, optical elements of the first set of optical elements at the first light output region arranged in the transverse direction relative to one another and optical elements of the first set of optical elements at the first light output region arranged in the longitudinal direction relative to one another, optical elements of the second set of optical elements at the second light output region arranged in the transverse direction relative to one another and optical elements of the second set of optical elements at the second light output region arranged in the longitudinal direction relative to one another, wherein light from the light emitters propagates in the light guide by total internal reflection at the major surfaces, light output from the lighting assembly by the first set of optical elements has a first light ray angle distribution and light output from the lighting assembly by the second set of optical elements has a second light ray angle distribution, the light emitters being arrayed along the light input edge in the transverse direction, and a measurement plane being defined to be perpendicular to the transverse direction and to the first major surface or the second major surface of the light guide, wherein:
the first light ray angle distribution in the measurement plane is narrower than an omnidirectional output distribution and the second light ray angle distribution in the measurement plane is narrower than an omnidirectional output distribution; and
a peak of the second light ray angle distribution in the measurement plane is displaced from a peak of the first light ray angle distribution in the measurement plane.

20. The lighting assembly of claim 19, wherein:
the optical elements of the first set of optical elements and the optical elements of the second set of optical elements have the same shape type;
the optical elements of the first set of optical elements are nominally identical to one another in shape;
the optical elements of the second set of optical elements are nominally identical to one another in shape; and
the optical elements of the first set of optical elements are different in shape from the optical elements of the second set of optical elements.

* * * * *